(12) United States Patent
Kuras

(10) Patent No.: US 6,393,945 B1
(45) Date of Patent: May 28, 2002

(54) APPARATUS AND METHOD FOR PREVENTING HUNTING BETWEEN RANGES IN A CONTINUOUSLY VARIABLE TRANSMISSION

(75) Inventor: Brian D. Kuras, East Peoria, IL (US)

(73) Assignee: Caterpillar Inc., Peoria, CA (US)

( * ) Notice: Subject to any disclaimer, the term of this patent is extended or adjusted under 35 U.S.C. 154(b) by 0 days.

(21) Appl. No.: 09/666,644

(22) Filed: Sep. 21, 2000

(51) Int. Cl.$^7$ ............................................... F16H 47/04
(52) U.S. Cl. ........................................ 74/733.1; 475/80
(58) Field of Search .............................. 475/76, 80, 81; 74/731.1, 732.1, 733.1

(56) References Cited

U.S. PATENT DOCUMENTS

| | | | |
|---|---|---|---|
| 4,043,227 A | * 8/1977 | Beals et al. | ................... 475/78 |
| 4,431,096 A | 2/1984 | Kobayashi et al. | |
| 4,809,564 A | 3/1989 | Sakai | |
| RE33,126 E | * 12/1989 | Wittke | ......................... 474/76 |
| 4,977,797 A | * 12/1990 | Aoki et al. | .................. 477/129 |
| 5,316,116 A | 5/1994 | Slicket et al. | |
| 5,335,566 A | 8/1994 | Genise et al. | |
| 5,449,329 A | 9/1995 | Brandon et al. | |
| 5,806,370 A | 9/1998 | Carlson et al. | |
| 5,857,161 A | 1/1999 | Zeilinger et al. | |
| 5,857,937 A | * 1/1999 | Ashizawa et al. | ............ 477/43 |
| 5,916,050 A | 6/1999 | Coutant et al. | |
| 6,001,038 A | 12/1999 | Wontner et al. | |
| 6,063,002 A | * 5/2000 | Nobumoto et al. | ........... 477/41 |

FOREIGN PATENT DOCUMENTS

JP        11-94064 A    * 4/1999

* cited by examiner

Primary Examiner—Charles A Marmor
Assistant Examiner—Ankur Parekh
(74) Attorney, Agent, or Firm—John W. Morrison

(57) ABSTRACT

A transmission assembly having a continuously variable transmission, a mechanical transmission coupled to the continuously variable transmission for selecting a first gear range and a second gear range, and a controller for receiving operator inputs and generating commands operable to control an output of the continuously variable transmission is disclosed. The controller executes a first shift between the first gear range and the second gear range at a shift point in response to the commands. The controller places the transmission in a first mode of operation whereby a second shift from the second gear range to the first gear range is inhibited. The controller places the transmission in a second mode of operation where the second shift from the second gear range to the first gear range is allowed when the output progresses beyond the shift point by a first value or the command falls past the shift point by a second value. The controller executes the second shift from the second gear range to the first gear range when the transmission is in the second mode of operation and the output reaches the output at the shift point. A method of controlling a transmission assembly is also disclosed.

18 Claims, 3 Drawing Sheets

APPARATUS AND METHOD FOR PREVENTING HUNTING BETWEEN RANGES IN A CONTINUOUSLY VARIABLE TRANSMISSION

TECHNICAL FIELD OF THE INVENTION

The present invention generally relates to a continuously variable transmission, and more specifically to an apparatus and method for preventing hunting between ranges in a continuously variable transmission.

BACKGROUND OF THE INVENTION

Many work machines, particularly earth working machines, use a continuously variable transmission to drive traction wheels or tracks which propel the work machine. Typically, a hydrostatic transmission, consisting of a variable speed hydraulic pump and a hydraulic motor, provides a continuously variable speed output to the wheels or tracks of the work machine. In particular, the speed output can be continuously varied by controlling the displacement of the hydraulic pump.

In order to operate over a wide range of operating conditions, the engine torque is split between the hydrostatic transmission and a mechanical transmission. The mechanical transmission has a number of transmission ranges corresponding to different operating speeds of the work machine. The combination of the hydrostatic transmission and the mechanical transmission allows a continuously variable transmission to operate over a wider range of speeds than is possible using the hydrostatic transmission alone.

A drawback to using a number of transmission ranges is that the transmission can "hunt" or continuously shift between ranges. As the transmission hunts, performance of the transmission can be degraded by the numerous toque interruptions which accompany each shift. Conventional transmissions employ timer based anti-hunt routines which inhibit a downshift subsequent to an upshift during a timer period after the upshift. Similarly, anti-hunt routines inhibit an upshift subsequent to a downshift during the timer period after the downshift. In addition to timers, the upshift and downshift point are selected to build in a natural hysteresis. A second downshift point is selected which allows a downshift ignoring the timer, but this shift point is associated with a deep engine lug (which is undesirable in continuously variable transmission applications).

In addition, most conventional transmissions also employ a torque converter between the engine and the transmission. The torque converter provides a fluid coupling which absorbs shocks during shifting. Moreover, the torque converter allows the engine to remain within its operating range as transmission loads vary considerably. Thus, the torque converter allows the engine to continue operating effectively if the output load increases rapidly during the timer period.

For efficiency reasons, it is unnecessary and undesirable to use a torque converter in conjunction with a continuously variable transmission. A drawback to eliminating the torque converter is that when using a timer based anti-hunt routine, a rapid increase in transmission load during the timer period may stall the engine. Thus, an anti-hunt routine for a continuously variable transmission must be able to rapidly respond to changes in transmission load and cannot use timer based anti-hunt routines, while still shifting near the shift point (near a synchronous speed) in order to allow the variable displacement hydraulic pump to be the sole device for changing transmission ratio.

What is needed therefore is a method and apparatus for preventing hunting between ranges in a continuously variable transmission which overcomes the above-mentioned drawbacks.

DISCLOSURE OF THE INVENTION

In accordance with a first aspect of the present invention, there is provided a transmission assembly having a continuously variable transmission driven by the engine, a mechanical transmission coupled to the continuously variable transmission for selecting a first gear range and a second gear range and a controller for receiving operator inputs and generating commands operable to control an output of the continuously variable transmission. The controller executes a first shift between the first gear range and the second gear range at a shift point in response to the commands. The controller places the transmission in a first mode of operation where a second shift from the second gear range to the first gear range is inhibited. The controller places the transmission in a second mode of operation where the second shift from the second gear range to the first gear range is allowed when the output progresses beyond the shift point by a first value or the command falls past the shift point by a second value. The controller executes the second shift from the second gear range to the first gear range when the transmission is in the second mode of operation and the output reaches the output at the shift point.

In accordance with a second aspect of the present invention, there is provided a method of controlling a transmission assembly having a continuously variable transmission driven by the engine, a mechanical transmission coupled to the continuously variable transmission for selecting a first gear range and a second gear range, and a controller for receiving operator inputs and generating commands operable to control an output of the continuously variable transmission. The method includes the steps of executing a first shift between the first gear range and the second gear range at a shift point in response to the commands and placing the mechanical transmission in a first mode of operation where a second shift from the second gear range to the first gear range is inhibited in response to the executing step. The method further includes the step of placing the mechanical transmission in a second mode of operation where the second shift from the second gear range to the first gear range is allowed when the output progresses beyond the shift point by a first value or the command falls past the shift point by a second value. The method yet further includes the step of executing the second shift from the second gear range to the first gear range when the mechanical transmission is in the second mode of operation and the output reaches the output at the shift point.

BEST MODE FOR CARRYING OUT THE INVENTION

Figure 1:
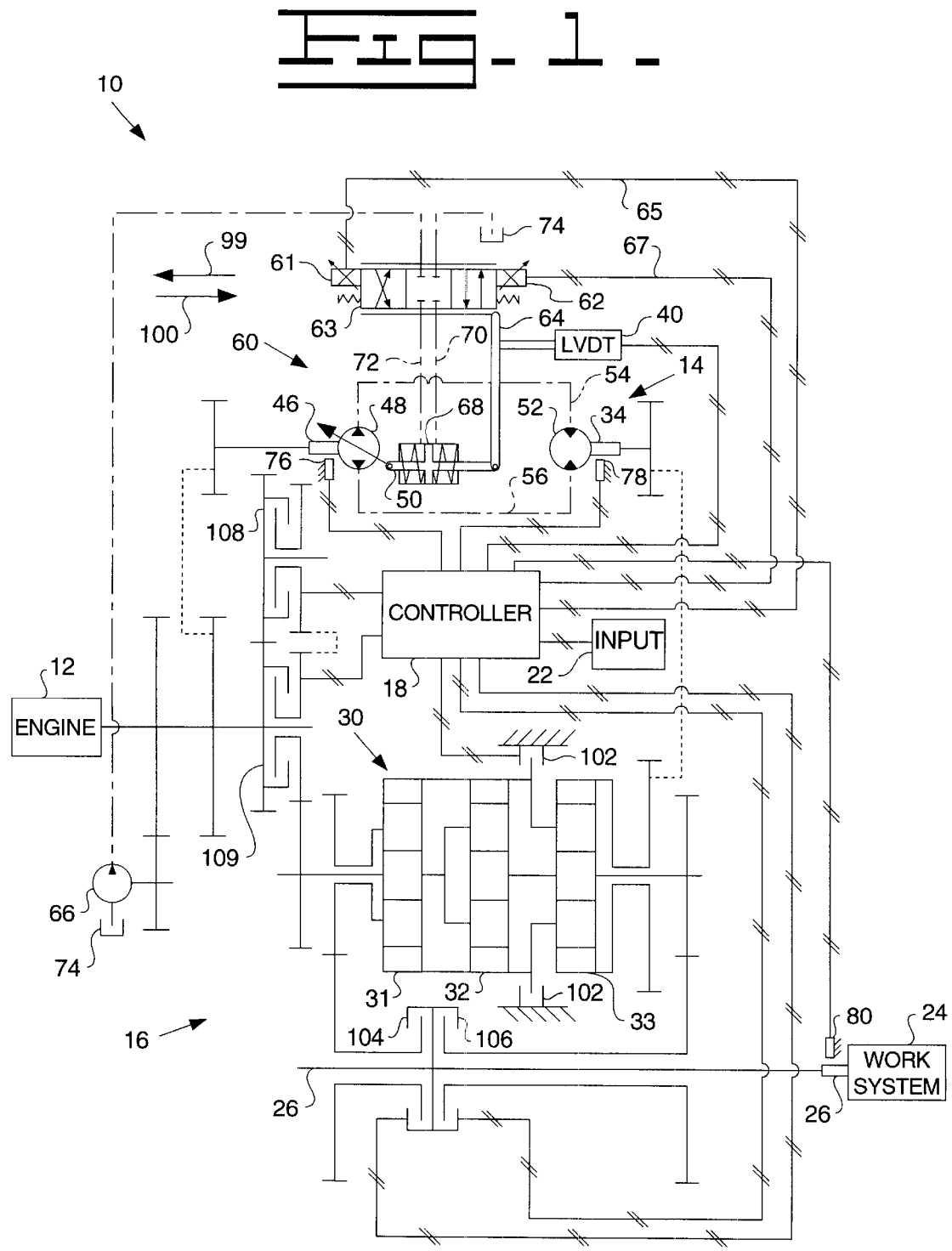
FIG. 1 is a schematic view of a hydro-mechanical, continuously variable transmission which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type which includes a continuously variable hydrostatic transmission 14, a mechanical transmission 16, a micro-processor based controller 18, and a command input arrangement 22. A work system 24 is connected to the transmission is assembly 10 via a drive shaft 26. The work system 24 is typically the drive wheels or tracks of the work machine.

The hydrostatic transmission 14 is operatively connected to the engine 12 through a pump input drive shaft 46. The hydrostatic transmission 14 includes a variable displacement pump 48 and a motor 52 operatively connected to the variable displacement pump 48 by conduits 54 and 56 to form a hydraulic circuit. A displacement controller 50 sets the displacement of the variable displacement pump 48, and thus, controls the flow of hydraulic fluid between the variable displacement pump 48 and the motor 52. Varying the flow varies the speed of the motor output shaft 34 of the motor 52.

The position of the pump displacement controller 50 is controlled by an electro-hydraulic servo mechanism 60. The servomechanism 60 includes a first solenoid or first actuator 61 and a second solenoid or second actuator 62, a three position four way valve 63, and a feedback arm 64. When an electric current, or a first actuator signal, is supplied to the first actuator 61 via a signal line 65, the first actuator 61 moves the three position valve 63 in the direction of arrow 100 so as to place the valve 63 in a first position. In the first position, the valve 63 causes high pressure fluid from a separate pump 66 to be supplied to a piston member 68 via a line 70 which causes the displacement controller 50 to move in the general direction of arrow 99. Movement of the displacement controller 50 in the general direction of arrow 99 places the variable displacement pump 48 in a positive displacement. Excess fluid exits the displacement controller 50 via a line 72 and is returned to a fluid sump 74. The force of the fluid on the piston member 68 also acts on the position feedback arm 64 in the general direction of arrow 99. An equilibrium is set up between the force exerted by the first actuator 61 in the general direction of arrow 100 and the force exerted by position feedback arm 64 in the general direction of arrow 99. Thus, for positive displacements, the position of the displacement controller 50 is proportional to the current supplied to the first actuator 61 as the first actuator command.

When an electric current, or a second actuator signal, is supplied to the second actuator 62 via a signal line 67, the second actuator 62 moves the three position valve 63 in the direction of arrow 99 so as to place the valve 63 in a second position. In the second position, the valve 63 causes high pressure fluid from the charge pump 66 to be supplied to a piston member 68 via the line 72 which causes the displacement controller 50 to move in the general direction of arrow 100. Movement of the displacement controller 50 in the general direction of arrow 100 places the variable displacement pump 48 in a negative displacement. Excess fluid exits the displacement controller 50 via the line 70 and is returned to a fluid sump 74. The force of the fluid on the piston member 68 also acts on the position feedback arm 64 in the general direction of arrow 100. An equilibrium is set up between the force exerted by the second actuator 62 in the general direction of arrow 99 and the force exerted by position feedback arm 64 in the general direction of arrow 100. Thus, for negative displacements, the position of the displacement controller 50 is proportional to the current supplied to the second actuator 62 as the second actuator command.

As the current supplied to the first actuator 61 and second actuator 62 is proportional to the displacement of the variable displacement pump 48, the current level of the first actuator signal or second actuator signal may be used to determine the displacement of the variable displacement pump 48. Alternately, a position sensor, such as a LVDT 40, may be used to sense the position of the feedback arm 64 and return a position signal to the controller 18. The position signal from the LVDT 40 is indicative of the displacement of the variable displacement pump 48.

Figure 2:
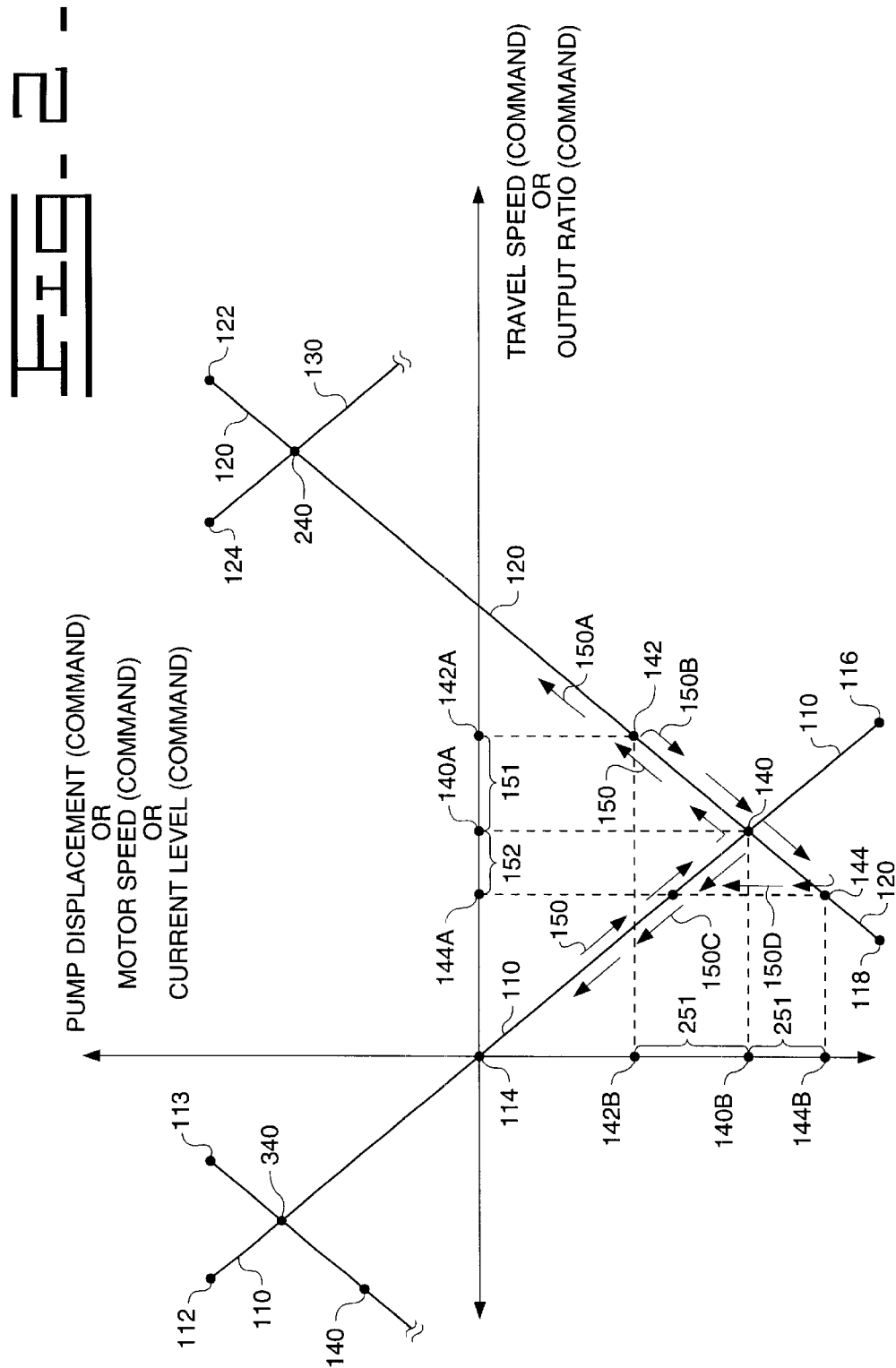
FIG. 2 is a graph of the operation of the transmission of FIG. 1 during an upshift from a first gear range to a second gear range.

Referring now to FIGS. 1 and 2, the mechanical transmission 16 includes a summing planetary gear arrangement 30, having a first planetary gear set 31, a second planetary gear set 32, and a third planetary gear set 33 which selectively combines the output from the continuously variable hydrostatic transmission 14 with the output of the engine 12 to drive the output shaft 26.

To place the mechanical transmission in a first gear range 110, a clutch 102 and a clutch 104 are engaged. In the first gear range 110, the transmission provides a continuously variable travel speed between a point 112, where the displacement of the variable displacement pump 48 is near the maximum positive displacement, and a point 116, where the displacement of the variable displacement pump 48 is near the maximum negative displacement. It should be appreciated that operation in the first gear range 110 moves the work machine in a reverse direction between the points 112 and 114 and a forward direction between the points 114 and 116.

To place the mechanical transmission 16 in a second gear range 120, a clutch 108 and the clutch 104 are engaged. In the second gear range 120, the transmission 10 provides a continuously variable travel speed between the point 118, where the displacement of the variable displacement pump 48 is near the maximum negative displacement, and a point 122, where the displacement of the variable displacement pump 48 is near the maximum positive displacement.

To place the mechanical transmission 16 in a third gear range 130, the clutch 108 and a clutch 106 are engaged. In the third gear range 130, the transmission 10 provides a continuously variable travel speed between the point 124, where the displacement of the variable displacement pump 48 is near the maximum positive displacement, and a maximum negative displacement point (not shown).

To place the mechanical transmission 16 in a second reverse gear range 210, a clutch 109 and the clutch 104 are engaged. In the second reverse gear range 210, the transmission 10 provides a continuously variable travel speed between the point 113, where the displacement of the variable displacement pump 48 is near the maximum positive displacement, and a maximum negative displacement point (not shown). It should also be appreciated that a third reverse gear range (not shown) can be selected by engaging the clutch 109 and the clutch 106.

Referring again to FIG. 1, the transmission assembly 10 further includes a transmission input speed sensor 76 operative to sense the speed of the pump input shaft 46 and direct a transmission input speed signal representative of the transmission input speed or engine speed to the controller 18. The transmission assembly 10 yet further includes a motor speed sensor 78 operative to sense the speed of the motor output shaft 34 and direct a motor speed signal representative of the motor output speed to the controller 18. The motor speed signal combined with the transmission input speed signal can also be used to determine a transmission output speed and a machine travel speed if the engagement state of the clutches 102, 104, 106, 108, and 109 are known.

The transmission 10 further includes a transmission output speed sensor 80 operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and therefore has a much higher resolution and lower dropout than the transmission output speed sensor 80. Thus, it is preferable to use the motor speed sensor 78 and the engagement state of the clutches 102, 104, 106, 108, and 109 to determine the transmission output speed and the machine travel speed. However, it is still possible and practical to use the output speed sensor 80 to determine machine travel speed. In addition, a transmission ratio, or the ratio of the speed of the output shaft 26 to the speed of the engine 12 may be derived from the transmission output speed signal and the transmission input speed signal.

The command input arrangement 22 receives operator inputs and transmits desired velocity and directional signals to the controller 18. The controller 18 includes RAM and ROM (not shown) that store transmission control software. The controller 18 reads the desired velocity, directional signals, and speed signals, and transmits clutch control signals to control the engagement of the clutches 102, 104, 106, 108, 109 to engage the appropriate gear range as described above. In addition, the controller 18 generates the first actuator command signal and the second actuator command signals which control the displacement of the pump 48, and thus, the speed of the output shaft 34 of the motor 52.

Referring now to FIG. 2, there is shown the operation of the present invention during an upshift from the first gear range 110 to the second gear range 120 based on the travel speed and the travel speed command. As the transmission assembly 10 operates along the path 150, the controller 18 executes a first shift from the first gear range 110 to the second gear range 120 when the output, or travel speed, reaches the speed 140A corresponding to a shift point 140. It should be appreciated that the shift point 140 may not necessarily occur at the intersection of line 110 and line 120 for all operating conditions. At this point, the mechanical transmission 16 is placed in a first mode of operation whereby any subsequent shift from the second gear range 120 to the first gear range 110 is inhibited. The mechanical transmission 16 is placed in the first mode of operation to prevent "hunting" or the continuous shifting between the first gear range 110 and the second gear range 120. Hunting is not desirable as each shift is accompanied by a torque interruption which adversely affects the performance of the transmission 10.

As the transmission assembly 10 continues to operate in the second range 120, the transmission 10 may either operate along the path 150A or the path 150B. If the transmission follows the path 150A, the transmission 10 has progressed beyond the shift point 140 by a first value 151 at a speed 142A corresponding to an operating point 142. The term "progresses beyond" as used herein indicates a speed greater than the speed 142A after an upshift. Once the transmission 10 is operating in the second gear range 120 beyond the operating point 142, the mechanical transmission 16 is placed in a second mode of operation whereby shifts from the second gear range 120 to the first gear range 110 are no longer inhibited.

Thus, once the mechanical transmission 16 is placed in the second mode of operation, the controller 18 can command the mechanical transmission 16 to shift from the second range 120 to the first range 110 when the output of the transmission 10 reaches the speed 140A corresponding to the shift point 140. The term "reaches" as used herein indicates a speed less than or equal to the speed 140A after an upshift. The mechanical transmission 16 is allowed to shift from the second gear range 120 to the first gear range 110 because operation beyond the point 142 is sufficiently far from the shift point 140 such that the transmission 10 has little likelihood of hunting between the first gear range 110 and the second gear range 120.

When the transmission 10 is operating along the path 150B, the travel speed output is moving back toward the shift point 140 while in the first mode of operation. The mechanical transmission 16 remains in the first mode of operation (inhibiting a down shift) until the speed command falls past the shift point 140 by a second value 152 at a speed 144A corresponding to the operating point 144. When the transmission 10 is operating in the first mode of operation along the path 150C, the speed command has fallen past the speed 144A before the actual output speed reaches the shift point 140 at speed of 140A. The term "fallen past" used herein indicates a speed less than or equal to after an upshift. The mechanical transmission 16 is placed in the second mode of operation and the shift from the second gear range 120 to the first gear range 110 is no longer inhibited. Thus, the transmission 10 shifts from the second gear range 120 to the first gear range 110 immediately upon the speed output reaching the speed 140A corresponding to the shift point 140.

When the transmission 10 is operating in the first mode of operation along the path 150D, the speed command has not fallen past the speed 144A when the output speed reaches the speed 140A at the shift point 140. Thus, the mechanical transmission 16 remains in the first mode of operation and the shift from the second gear range 120 to the first gear range 110 is inhibited. The mechanical transmission 16 remains in the first mode of operation until the speed command falls past the speed 144A corresponding to the operating point 144 where the mechanical transmission 16 is placed in the second mode of operation. When the speed command falls past the speed 144A and the output speed has reached the speed 140A (which has already occurred when operating along the path 150D), the controller 18 commands the mechanical transmission 16 to shift from the second gear range 120 to the first gear range 110. It should be noted that the mechanical transmission 16 shifts from the second gear range 120 to the first gear range 110 prior to the actual speed reaching the speed 144A. This is due to a lag between the speed command and the actual speed. It should be appreciated that an advantage of inhibiting the second shift based on the speed command, rather than the actual speed, is that the transmission 10 can rapidly respond to real changes in command without stalling the engine 12. If the shift were inhibited until the actual speed fell past the shift point 140 by the second value 152, it is likely that the engine 12 would stall.

It should be appreciated that transmission ratio may be substituted for output speed in the above example and obtain the same result. For example, the shift from the first gear range 110 to the second gear range 120 may occur at a transmission ratio 140A corresponding to the operating point 140. Similarly, the mechanical transmission 16 may remain in the first mode of operation until the actual transmission ratio progresses beyond the transmission ratio 140A by a first value 151 at the transmission ratio 142A corresponding to the operating point 142. In addition, the mechanical transmission 16 remains in the first mode of operation until the transmission ratio command falls past the transmission ratio 144A corresponding to the operating point 144 and the mechanical transmission 16 is placed in the second mode of operation. The transmission 10 shifts from the second gear range 120 to the first gear range 110 when the mechanical transmission 16 is in the second mode of operation and the transmission ratio reaches the transmission ratio 140A corresponding to the shift point 140.

Alternately, the operation of the transmission 10 during an upshift from the first gear range 110 to the second gear range 12 may be based on the pump displacement and pump displacement command. As the transmission 10 operates along the path 150, the controller 18 executes a first shift from the first gear range 110 to the second gear range 120 when the output, or displacement, reaches the displacement 140B corresponding to a shift point 140. At this point, the mechanical transmission 16 is placed in the first mode of operation.

As the transmission 10 continues to operate in the second range 120, the transmission 10 may either operate along the path 150A or the path 150B. If the transmission follows the path 150A, the transmission 10 has progressed beyond the shift point 140 by a first value 251 at a displacement 142B corresponding to an operating point 142. Once the transmission 10 is operating in the second gear range 120 beyond the operating point 142, the mechanical transmission 16 is placed in a second mode of operation.

Thus, once the mechanical transmission 16 is placed in the second mode of operation, the controller 18 can command the mechanical transmission 16 to shift from the second range 120 to the first range 110 when the actual displacement reaches the displacement 140B corresponding to the shift point 140. The mechanical transmission 16 is allowed to shift from the second gear range 120 to the first gear range 110 because operation beyond the point 142 is sufficiently far from the shift point 140 such that the transmission 10 has little likelihood of hunting between the first gear range 110 and the second gear range 120.

When the transmission 10 is operating along the path 150B, the pump displacement output is moving back toward the shift point 140 while in the first mode of operation. The mechanical transmission 16 remains in the first mode of operation (inhibiting a downshift) until the displacement command falls past the shift point 140 by a second value 252 at a displacement of 144B corresponding to the operating point 144. When the transmission 10 is operating along the path 150C, the displacement command has fallen past the displacement 144B before the actual displacement reaches the shift point 140 at the displacement 140A. The mechanical transmission 16 is in the second mode of operation and the shift from the second gear range 120 to the first gear range 110 is no longer inhibited. Thus, the transmission 10 shifts from the second gear range 120 to the first gear range 110 immediately upon the displacement reaching the displacement 140B corresponding to the shift point 140.

When the transmission 10 is operating in the first mode of operation along the path 150D, the displacement command has not fallen past the displacement 144B when the actual displacement reaches the displacement 140B at the shift point 140. Thus, the mechanical transmission 16 remains in the first mode of operation and the shift from the second gear range 120 to the first gear range 110 is inhibited. The mechanical transmission 16 remains in the first mode of operation until the displacement command falls past the displacement 144B at the operating point 144 where the mechanical transmission 16 is placed in the second mode of operation. When the displacement command falls past the displacement 144B and the actual displacement has reached the displacement 140B at the shift point 140 (which has already happened when operating along the path 150D), the controller 18 commands the mechanical transmission to shift from the second gear range 120 to the first gear range 110. It should be noted that the mechanical transmission 16 shifts from the second gear range 120 to the first gear range 110 prior to the actual displacement reaching the displacement 144B. This delay is due to a lag between the displacement command and the actual displacement. It should be appreciated that an advantage of inhibiting the second shift based on the displacement command, rather than the actual displacement, is that the transmission 10 can rapidly respond to real changes in command without stalling the engine 12. If the shift were inhibited until the actual displacement fell past the shift point by the second value 252, then it is likely that the engine 12 would stall.

It should be appreciated that electric current level may be substituted for displacement where the servo mechanism 60 provides a displacement directly proportional to current level. For example, the shift from the first gear range 110 to the second gear range 120 may occur at a current level 140B corresponding to the operating point 140. Similarly, the mechanical transmission 16 remains in the first mode of operation until the actual current level progresses beyond the current level 140B by a first value 251 at the current level 142B corresponding to the operating point 142. In addition, the mechanical transmission 16 remains in the first mode of operation until the current level command falls past the current level 144B corresponding to the operating point 144 where the mechanical transmission 16 is placed in the second mode of operation. The transmission 10 shifts from the second gear range 120 to the first gear range 110 when the mechanical transmission 16 is in the second mode of operation and the current level reaches the current level 140B corresponding to the shift point 140.

Figure 3:
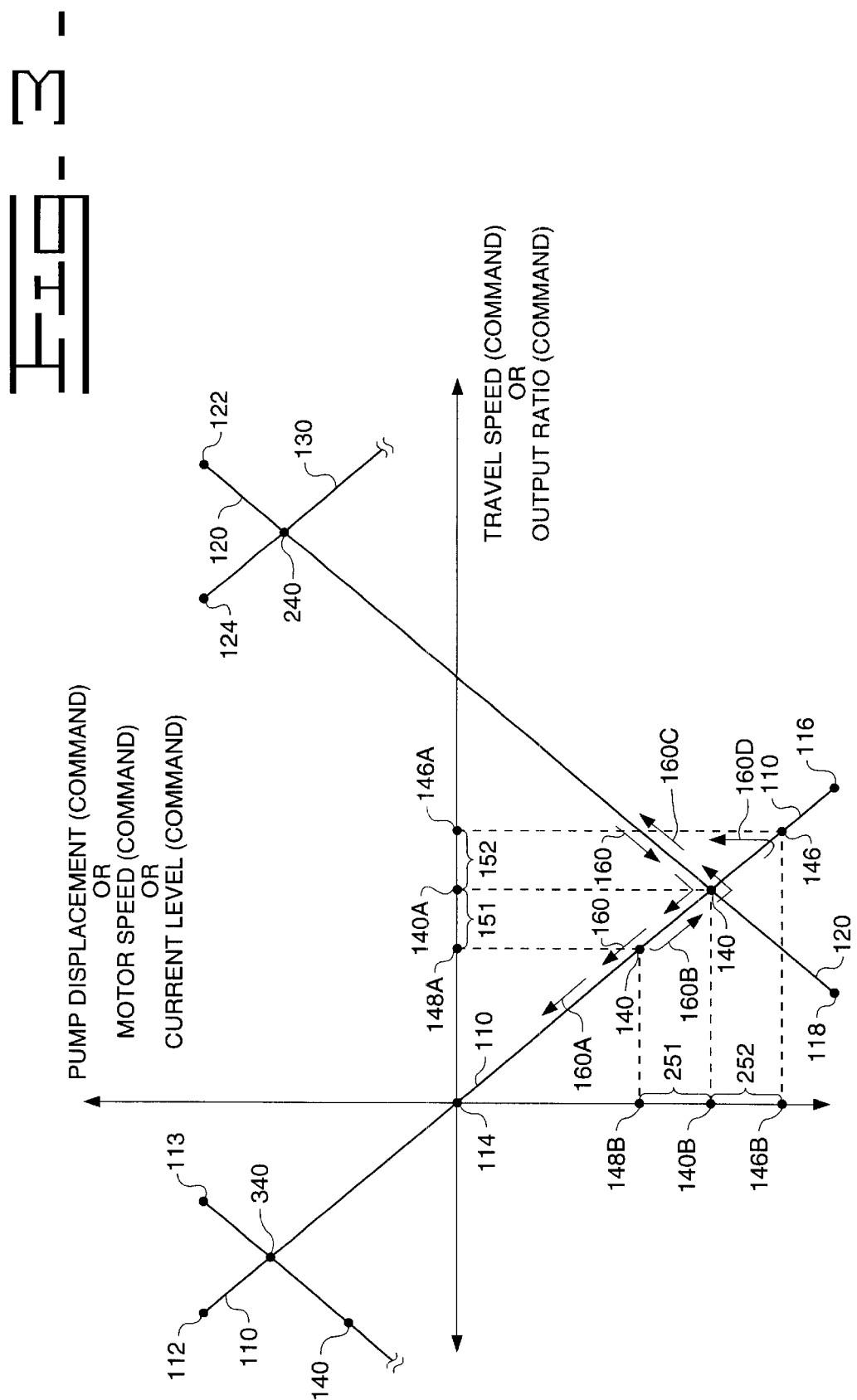
FIG. 3 is a graph of the operation of the transmission of FIG. 1 during a downshift from the second gear range to the first gear range.

Referring now to FIG. 3, there is shown the operation of the present invention during a downshift from the second gear range 120 to the first gear range 110 based on the travel speed and the travel speed command. As the transmission 10 operates along the path 160, the controller 18 executes a first shift from the second gear range 120 to the first gear range 110 when the output, or travel speed, reaches the speed 140A corresponding to a shift point 140. At this point, the mechanical transmission 16 is placed in a first mode of operation whereby any subsequent shift from the first gear range 110 to the second gear range 120 is inhibited.

As the transmission 10 continues to operate in the first gear range 110, the transmission 10 may either operate along the path 160A or the path 160B. If the transmission follows the path 160A, the transmission 10 has progressed beyond the shift point 140 by a first value 151 at a speed 148A corresponding to an operating point 148. The term "progresses beyond" as used herein indicates a speed less than the speed 148A after a downshift. Once the transmission 10 is operating in the first gear range 110 beyond the operating point 148, the mechanical transmission 16 is placed in a second mode of operation whereby shifts from the first gear range 110 to the second gear range 120 are no longer inhibited.

Thus, once the mechanical transmission 16 is placed in the second mode of operation, the controller 18 can command the mechanical transmission 16 to shift from the first range 110 to the second gear range 120 when the output of the transmission 10 reaches the speed 140A corresponding to the shift point 140. The term "reaches" as used herein indicates a speed greater than or equal to the speed 140A after a downshift. The mechanical transmission 16 is allowed to shift from the first gear range 110 to the second gear range 120 because operation beyond the point 148 is sufficiently far from the shift point 140 such that the transmission 10 has little likelihood of hunting between the second gear range 120 and the first gear range 110.

When the transmission 10 is operating along the path 160B, the output is moving back toward the shift point 140 while in the first mode of operation. The mechanical transmission 16 remains in the first mode of operation (inhibiting an upshift) until the speed command has fallen past the shift point 140 by a second value 152 at a speed of 146A corresponding to the operating point 146. The term "fallen past" used herein indicates a speed greater than or equal to after a downshift. If the transmission 10 is operating in the first mode of operation along the path 160C, the speed command has fallen past the speed 146A when the actual output speed reaches the shift point 140 at speed 140A. The mechanical transmission 16 is in the second mode of operation and the shift from the first gear range 110 to the second gear range 120 is no longer inhibited. Thus, the transmission 10 shifts from the first gear range 110 to the second gear range 120 immediately upon the speed output reaching the speed 140A corresponding to the shift point 140.

When the transmission 10 is operating in the first mode of operation along the path 160D, the speed command has not fallen past the speed 146A when the output speed reaches the speed 140A at the shift point 140. Thus, the mechanical transmission 16 remains in the first mode of operation and the shift from the first gear range 110 to the second gear range 120 is inhibited. The mechanical transmission 16 remains in the first mode of operation until the speed command falls past the speed 146A where the mechanical transmission 16 is placed in the second mode of operation. When the speed command falls past the speed 146A and the output speed has reached the speed 140A of the shift point 140 (which has already happened when operating along the line 150D), then controller 18 commands the mechanical transmission 16 to shift from the first gear range 110 to the second gear range 120. It should be noted that the mechanical transmission 16 shifts from the first gear range 110 to the second gear range 120 prior to the actual speed reaching the speed 146A. This is due to a lag between the speed command and the actual speed.

It should be appreciated that transmission ratio may be substituted for output speed in the above example and obtain the same result. For example, the shift from the second gear range 120 to the first gear range 110 may occur at a transmission ratio 140A corresponding to the shift point 140. Similarly, the mechanical transmission 16 may remain in the first mode of operation until the actual transmission ratio progresses beyond the transmission ratio 140A by a first value 151 at the transmission ratio 148A corresponding to the operating point 148. In addition, the mechanical transmission 16 remains in the first mode of operation until the transmission ratio command falls past the transmission ratio 146A corresponding to the operating point 146 and the mechanical transmission 16 is placed in the second mode of operation. The transmission 10 shifts from the first gear range 110 to the second gear range 120 when the mechanical transmission 16 is in the second mode of operation and the transmission ratio falls past the transmission ratio 140A corresponding to the shift point 140.

Alternately, the operation of the transmission 10 during the downshift from the second gear range 120 to the first gear range 110 may be based on the pump displacement and pump displacement command. As the transmission 10 is operating along the path 160, the controller 18 executes a first shift from the second gear range 120 to the first gear range 110 when the output, or displacement, reaches the displacement 140B corresponding to a shift point 140. At this point, the mechanical transmission 16 is placed in the first mode of operation.

As the transmission 10 continues to operate in the first range 110, the transmission 10 may either operate along the path 160A or the path 160B. If the transmission operates along the path 160A, the transmission 10 has progressed beyond the shift point 140 by a first value 251 at a displacement 148B corresponding to an operating point 148. Once the transmission 10 is operating in the first gear range 110 beyond the operating point 148, the mechanical transmission 16 is placed in a second mode of operation.

Thus, once the mechanical transmission 16 is placed in the second mode of operation, the controller 18 can command the mechanical transmission 16 to shift from the first range 110 to the second range 120 when the actual displacement reaches the displacement 140B corresponding to the shift point 140. The mechanical transmission 16 is allowed to shift from the first gear range 110 to the second gear range 120 because operation beyond the point 148 is sufficiently far from the shift point 140 such that the transmission 10 has little likelihood of hunting between the second gear range 120 and the first gear range 110.

If the transmission 10 is operating along the path 160B, the output is moving back toward the shift point 140 while in the first mode of operation. The mechanical transmission 16 remains in the first mode of operation (inhibiting a downshift) until the displacement command falls past the shift point by a second value 252 at a speed of 146A corresponding to the operating point 146. If the transmission 10 is operating along the path 160C, the displacement command has fallen past the displacement 146B before the actual displacement reaches the shift point 140 at the displacement 140B. The mechanical transmission 16 is in the second mode of operation and the shift from the first gear range 110 to the second gear range 120 is no longer inhibited. Thus, the transmission 10 shifts from the first gear range 110 to the second gear range 120 immediately upon the displacement reaching the displacement 140B corresponding to the shift point 140.

If the transmission 10 is operating along the path 160D, the displacement command has not fallen past the displacement 146B when the actual displacement reaches the displacement 140B. Thus, the mechanical transmission 16 remains in the first mode of operation and the shift from the first gear range 110 to the second gear range 120 is inhibited. The mechanical transmission 16 remains in the first mode of operation until the displacement command falls past the displacement 146B corresponding to operating point 146 where the mechanical transmission 16 is placed in the second mode of operation. When the displacement command falls past the displacement 146B and the actual displacement reaches the displacement 140B at the shift point 140, then controller 18 commands the mechanical transmission 16 to shift from the first gear range 110 to the second gear range 120. It should be noted that the mechanical transmission 16 shifts from the first gear range 110 to the second gear range 120 prior to the actual displacement reaching the displacement 146B. This delay is due to a lag between the displacement command and the actual displacement. It should be appreciated that an advantage of inhibiting the second shift based on the command displacement, rather than the actual displacement, is that the transmission 10 can rapidly respond to real changes in command without stalling the engine 12.

It should be appreciated that current level may be substituted for displacement where a servo mechanism 60 provides for displacement directly proportional to current level. For example, the shift from the second gear range 120 to the first gear range 110 may occur at a current level 140B corresponding to the operating point 140. Similarly, the mechanical transmission 16 remains in the first mode of operation until the current level progresses beyond the current level 140B by a first value 251 at the current level 148B corresponding to the operating point 148. In addition, the mechanical transmission 16 remains in the first mode of operation until the current level command falls past the current level 146B corresponding to the operating point 146 where the mechanical transmission 16 is placed in the second mode of operation. The transmission 10 shifts from the first gear range 110 to the second gear range 120 when the mechanical transmission 16 is in the second mode of operation and the current level reaches the current level 140B corresponding to the shift point 140.

The present invention may also be used to prevent hunting between a shift from the second gear range 120 to the third gear range 130 near the shift point 240 as well as prevent hunting during a shift between the first gear range 110 and the second reverse gear range 140 near the shift point 340.

Industrial Applicability

In operation, subsequent to an upshift from the first gear range 110 to the second gear range 120, hunting between the first gear range 110 and the second gear range 120 is inhibited based on a command (either travel speed, transmission ratio, displacement, or current level) and an actual output (either travel speed, transmission ratio, displacement, or current level).

As the transmission 10 operates along the path 150, the controller 18 executes a first shift from the first gear range 110 to the second gear range 120 when the output reaches the output 140A, 140B corresponding to a shift point 140. At this point, the mechanical transmission 16 is placed in a first mode of operation whereby a subsequent shift from the second gear range 120 to the first gear range 110 is inhibited.

As the transmission 10 continues to operate in the second range 120 and progresses beyond the shift point 140 by a first value 151, 251 at the operating point 142, the mechanical transmission 16 is placed in a second mode of operation whereby shifts from the second gear range 120 to the first gear range 110 are no longer inhibited.

If the transmission 10 is operating along the path 150B, the output is moving back toward the shift point 140 while in the first mode of operation. The mechanical transmission 16 remains in the first mode of operation until the command falls past the shift point 140 by a second value 152, 252 at an output 144A, 144B.

As the transmission 10 is operating along the path 150C or 150D, the mechanical transmission 16 is placed in the second mode of operation when the command falls past the shift point 140 by the second value 152, 252 and the shift from the second gear range 120 to the first gear range 110 is no longer inhibited. The transmission 10 shifts from the second gear range 120 to the first gear range 110 when (i) the transmission is operating in the second mode of operation and (ii) the output reaches the output 140A, 140B corresponding to the shift point 140.

An advantage of inhibiting the second shift based on the command, rather than the output, is that the transmission 10 can rapidly respond to real changes in command without stalling the engine 12. Additionally, it should be appreciated that this method is applicable to downshifts as described above.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A transmission assembly driven by an engine comprising:
    a continuously variable transmission;
    a mechanical transmission coupled to the continuously variable transmission for selecting a first gear range and a second gear range; and
    a controller for receiving operator inputs and generating commands operable to control an output of the continuously variable transmission, wherein:
        the controller executes a first shift between the first gear range and the second gear range at a shift point in response to the commands,
        the controller places the mechanical transmission in a first mode of operation where a second shift from the second gear range to the first gear range is inhibited in response to executing the first shift,
        the controller places the mechanical transmission in a second mode of operation whereby the second shift from the second gear range to the first gear range is allowed when (i) the output progresses beyond the shift point by a first value or (ii) the command falls past the shift point by a second value, and
        the controller executes the second shift from the second gear range to the first gear range when the mechanical transmission is in the second mode of operation and the output reaches the output at the shift point.

2. The transmission assembly of claim 1, wherein the commands are speed commands and the output is the actual speed of an output shaft coupled to the mechanical transmission.

3. The transmission assembly of claim 2, further comprising an output speed sensor which measures the speed of the output shaft and generates an output speed signal in response thereto.

4. The transmission assembly of claim 1, wherein the commands are transmission ratio commands and the output is the ratio of the speed of the engine to the speed an output shaft of the mechanical transmission.

5. The transmission assembly of claim 4, further comprising:

an output speed sensor which measures the speed of the output shaft and generates an output speed signal in response thereto; and an engine speed sensor which measures the speed of an input shaft and generates an engine speed signal in response thereto, wherein the controller determines the ratio from the output speed signal and the engine speed signal.

6. The transmission assembly of claim 1, wherein:

the continuously variable transmission comprises a hydrostatic transmission with a variable displacement hydraulic pump and a hydraulic motor, and the commands are displacement commands which control a displacement of the variable displacement hydraulic pump and the output is the actual displacement of the pump.

7. The transmission assembly of claim 6, further comprising a servomechanism for controlling the displacement of the variable displacement hydraulic pump, wherein:

the current supplied to the servomechanism is proportional to the displacement of the variable displacement pump, and the displacement commands are an electric current level supplied to the servomechanism.

8. The transmission assembly of claim 6, further comprising a motor speed sensor which measures the speed of the hydraulic motor, wherein the displacement of the variable displacement pump is determined from the speed of the hydraulic motor.

9. The transmission assembly of claim 6, further comprising a LVDT which measures the displacement of the hydraulic motor, wherein the displacement of the variable displacement pump is determined from the LVDT.

10. A method of controlling a transmission assembly having (i) a continuously variable transmission, (ii) a mechanical transmission coupled to the continuously variable transmission for selecting a first gear range and a second gear range, and (iii) a controller for receiving operator inputs and generating commands operable to control an output of the continuously variable transmission, comprising the steps of:

executing a first shift between the first gear range and the second gear range at a shift point in response to the commands;

placing the mechanical transmission in a first mode of operation where a second shift from the second gear range to the first gear range is inhibited in response to the executing step;

placing the mechanical transmission in a second mode of operation where the second shift from the second gear range to the first gear range is allowed when (i) the output progresses beyond the shift point by a first value or (ii) the command falls past the shift point by a second value; and executing the second shift from the second gear range to the first gear range when the mechanical transmission is in the second mode of operation and the output reaches the output at the shift point.

11. The method of claim 10, wherein the commands are speed commands and the output is the actual speed of an output shaft coupled to the mechanical transmission.

12. The method of claim 11, further comprising the step of generating an output speed signal with an output speed sensor.

13. The method of claim 10, wherein the commands are transmission ratio commands and the output is the ratio of the speed of the engine to the speed an output shaft of the mechanical transmission.

14. The method of claim 13, wherein the transmission assembly further having (i) an output speed sensor which measures the speed of the output shaft and generates an output speed signal in response thereto, and (ii) an engine speed sensor which measures the speed of an input shaft and generates an engine speed signal in response thereto, further comprising the step of:

determining the transmission ratio from the output speed signal and the engine speed signal.

15. The method of claim 10, the continuously variable transmission having (i) a hydrostatic transmission with a variable displacement hydraulic pump and a hydraulic motor, further comprising the step of:

controlling the output of the continuously variable transmission with displacement commands which control the displacement of the variable displacement pump.

16. The method of claim 15, the transmission assembly further having a servomechanism for controlling the displacement of the variable displacement hydraulic pump wherein the current supplied to the servomechanism is proportional to the displacement of the variable displacement pump, further comprising the step of:

controlling the output of the continuously variable transmission with the current supplied to the servomechanism.

17. The method of claim 15, the transmission assembly further comprising a motor speed sensor which measures the speed of the hydraulic motor; further comprising the step of:

determining the displacement of the variable displacement pump from the speed of the hydraulic motor.

18. The method of claim 15, further comprising the step of determining the displacement of the variable displacement pump from a LVDT which measures the displacement of the hydraulic motor.

* * * * *